Dec. 26, 1939.  J. H. PRIEST  2,185,092
SAFETY HOOK
Filed Aug. 1, 1938   2 Sheets-Sheet 1
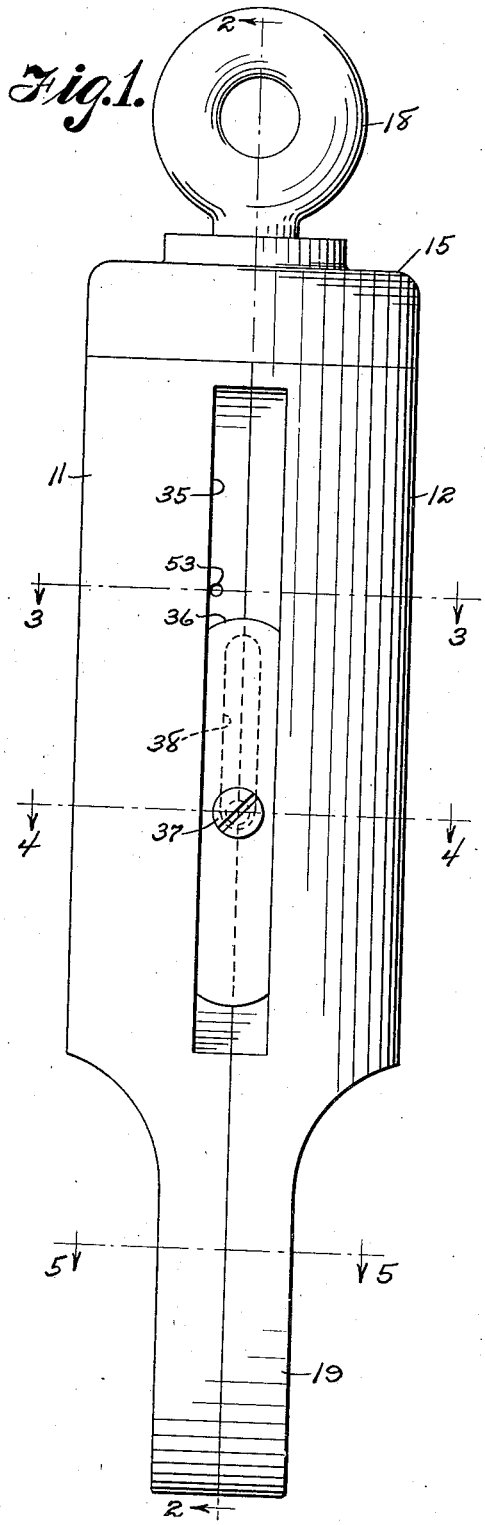
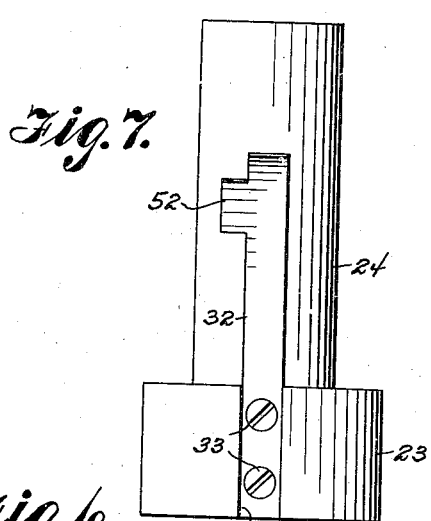
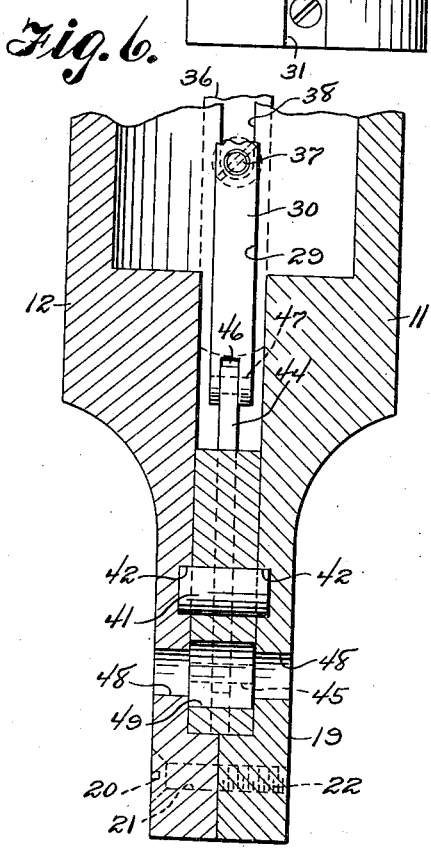
John H. Priest
INVENTOR
BY Victor J. Evans & Co.
ATTORNEYS Dec. 26, 1939.  J. H. PRIEST  2,185,092
SAFETY HOOK
Filed Aug. 1, 1938  2 Sheets-Sheet 2

John H. Priest
INVENTOR
BY Victor J. Evans & Co.
ATTORNEYS

Patented Dec. 26, 1939

2,185,092

UNITED STATES PATENT OFFICE 2,185,092

SAFETY HOOK

John H. Priest, Electra, Tex., assignor to A. E. Rapp, Wichita County, Tex.

Application August 1, 1938, Serial No. 222,555

1 Claim. (Cl. 294—83)

My invention relates to safety devices for lowering explosives and the like into oil wells and includes among its objects and advantages the provision of an improved safety hook.

An object of my invention is to provide a safety hook for lowering explosives and the like into oil wells in which means are incorporated for disconnecting the hook from the article lowered into the well and in which the safety hook is adjusted to its releasing position through a relatively large number of stages so as to prevent accidental disconnection should the bomb or the like meet a number of obstructions while being lowered.

A further object is to provide a safety hook embodying a novel releasing mechanism in which the mechanism is completely housed so as to be protected from sand and the like which might otherwise work into the mechanism and render it inefficient or inoperative for the purposes intended.

A further object is to provide a safety hook including a novel releasing mechanism inclosed within a protective housing but in which the mechanism is easily rendered accessible for the replacement or repair of parts.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is an elevational view of my safety hook;

Figure 6 is a sectional detail view along the line 6—6 of Figure 2; and

Figure 7 is a detail view of a part of the operating mechanism.

Figure 2:
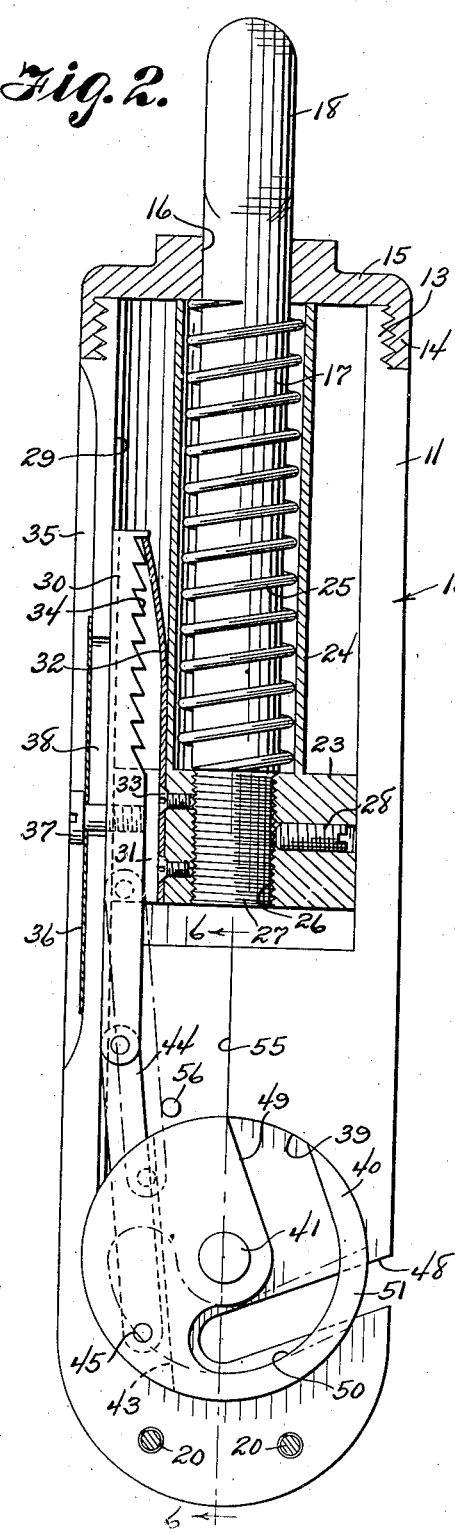
Figure 2 is sectional view along the line 2—2 of Figure 1.
Figure 3:
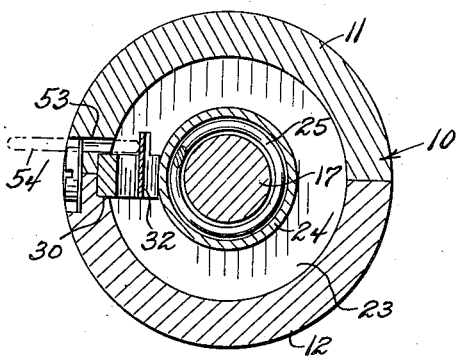
Figure 3 is a sectional view along the line 3—3 of Figure 1.
Figure 4:
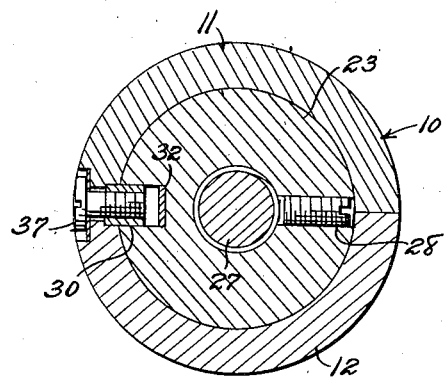
Figure 4 is a sectional view along the line 4—4 of Figure 1.
Figure 5:
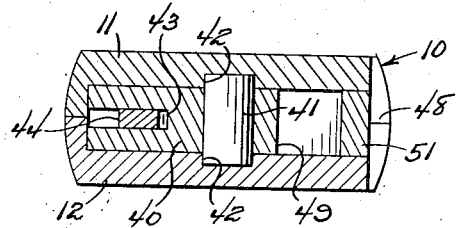
Figure 5 is a sectional view along the line 5—5 of Figure 1.

In the embodiment selected to illustrate my invention I make use of a tubular housing 10 made up of sections 11 and 12 each having a complimentary neck part 13 threaded at 14 for the reception of a threaded cap 15 having a bore 16 for slidably receiving the bolt 17 having an eye 18 for connection with the lowering rope or cable. The opposite ends of the sections 11 and 12 are flattened, as at 19, and connected into a unitary structure by bolts or screws 20 passing through openings 21 in one of the sections and having threaded relation at 22 with the other section for connecting the two parts into a unitary structure.

Within the tubular housing 10 I slidably mount a plunger head 23 having a bored guide 24 through which the bolt 17 extends. I mount a compression spring 25 upon the bolt 17. One end of the spring 25 is arranged in abutting relation with the cover 15 while the opposite end bears against the plunger head 23. Plunger head 23 is provided with a threaded bore 26 for connection with the threaded reach 27 of the bolt 17. A set screw 28 has threaded relation with the plunger head 23 for securing the threaded reach 27 against relative rotary movement.

Tubular housing 10 includes a longitudinal groove 29 in its inner face for slidably supporting and guiding a ratchet bar 30 which extends freely through the slot 31 in the plunger head 23. To the plunger head 23 and within the slot 31 I connect one end of a latch spring 32 through the medium of screws 33. According to Figure 2 the latch spring 32 has its upper end bowed in the direction of the latch bar 32 for bringing its end into latching relation with the teeth 34 on the bar. In the outer face of the tubular housing 10 I provide a longitudinal groove 35 within which I mount a thin steel strip 36 connected with a screw 37 extending through a slot 38 in the tubular casing 10 and threaded into the latch bar 30.

According to Figures 2 and 6 the sections 11 and 12 of the tubular casing are provided with aligned circular recesses 39 for rotatably housing a cam or releasing element 40 mounted on a shaft 41 which is journaled in bores 42 in the two sections. Cam or releasing element 40 rotates about the shaft 41 as an axis and is operated through the medium of the ratchet bar 34. Cam or releasing element 40 includes a slot 43 within which one end of a link 44 is positioned and pivotally connected with the cam or releasing element, as at 45. The opposite end of the link 44 lies within the slot 46 in the end of the ratchet bar 34 and is pivotally connected thereto, as at 47.

The flattened end of the tubular housing 10 is slotted at 48 for the reception of the bail attached to the bomb or other article being lowered into the well. Cam or releasing element 40 is provided with a slot 49 including a curvature 50 arranged to align with the inner end of the slot 48 and through which the bail of the torpedo likewise extends. Figure 2 illustrates the locking position of the cam or releasing element 40 at which time the finger 51 extends across the slot 48 to lock the bail of the torpedo within the slot.

While Figure 2 illustrates the latch spring 32 as having pressure relation with the latch bar 34 I provide means for manually releasing the spring from the bar. A wing 52 projects laterally from one side of the spring 32 while the tubular casing 11 is provided with the bore 53 for the reception of a pin 54 which may be inserted in the bore for pressing against the wing 52 and thereby moving the latching end of the spring 32 out of engagement with the latch bar 34.

From the foregoing description of the various parts of the device the operation thereof will be readily understood. Figure 2 illustrates the parts adjusted for lowering purposes at which time the end of the spring 32 engages the uppermost tooth in the bar 34. Should the bomb or other type of work being lowered engage an obstruction in the well such obstruction might cause the tubular casing 10 to move upwardly relatively to the bolt 17 for bringing the end of the spring 32 into abutting relation with the next tooth on the bar. Consequently when the load is again transmitted to the bolt 17 the latch bar 34 will be elevated a distance equal to the space between two teeth.

In the normal position of the parts according to Figure 2 the screw 37 lies at the lower end of the slot 38 but the slot is of such length as to accommodate relative upward movement of the latch bar 30 to the full range of the teeth 34. In Figure 2 the upper end of the bored guide 24 abuts the cap 15 so as to prevent the weight of the load from being transmitted to the latch spring 32. It will be noted that the head 23 is spaced from the bottom of the tubular housing 10 sufficiently far to permit the upper end of the latch spring 32 to be lowered for engagement with the next tooth on the rack bar 30. Such abutting relation confines relative movement between the latch spring and the bar within such limits as to actuate the latch bar one tooth at a time. The latch bar 30 includes a relatively large number of teeth so that meeting with an occasional obstruction in the well is not sufficient to shift the bar 34 sufficiently far to bring the cam or releasing element 40 to its releasing position.

Strip 36 comprises spring steel and is bowed outwardly at its center in the absence of pressure thereon. Bolt 37 flattens the spring strip against the bottom of the groove 35 so that spring tension is effective on the latch bar 30 for frictionally relating the bar to the bottom of the groove 29. Such frictional relation is sufficient to restrain the latch bar from relative downward movement as the latch spring 32 is lowered relatively to the bar for engagement with the next tooth thereon.

It will be noted according to Figure 2 that the slot in the cam or releasing element 40 is wider than the slot 48 which defines the hook for the bail. Thus the weight of the bail is transmitted directly to the hook so as to prevent any accidental shifting of the latch bar. Because of the angular position of the slot 48 with respect to the longitudinal axis of the tubular housing, the bail will of course maintain a position at the inner end of the slot 48 so as to eliminate any weight on the finger 51.

After lowering of the bomb the cam or releasing element 40 is rotated for bringing the outer end of the slot for its great reach into alignment with the slot 48 at which time the bail of the article being lowered may be released from the hook. After placement of the bomb the spring 32 shifts the latch bar 34 one tooth at a time toward the upper end of the casing 10 through successive lifting and lowering of the casing until the cam or releasing element 40 has been rotated to its open position with respect to the slot 48. Sections 11 and 12 of the tubular housing are recessed at 55 to accommodate the link 44 and to these sections I connect a cross pin 56 arranged to act as a stop for the link 44 when it has reached the dotted line position of Figure 2 at which time the cam 40 has been shifted to the releasing position.

Slot 48 is arranged at an acute angle to the longitudinal axis of the tubular housing 10 so that the slotted end of the housing functions as a hook even though the cam or releasing element 40 is in its releasing position. Under such conditions the hook may be completely detached from the bail connected therewith through further lowering of the tubular housing since the angularity of the slot 48 is such as to shift the bail laterally in the clear of the slot upon sufficient lowering of the hook. In addition to providing a safety hook which is efficient in operation and one in which a locked condition is maintained even though meeting with many obstructions in the well the mechanism is completely housed inside the tubular casing for protection against the entrance of sand and the like. Sections 11 and 12 may be completely separated by removing the bolts 20 and unscrewing the cap 15 from the threaded neck 14.

In resetting the latch bar 34 the spring 32 may be shifted to an inoperative position through the medium of the pin 54 and the rack 34 lowered to the position of Figure 2.

What is claimed is:

A safety lowering device comprising a tubular housing having a hook at one end, a lock element mounted for rotation on said hook for latching a bail to the hook, a line connecting means slidably mounted inside the tubular body and having a connecting eye positioned exteriorly of the body, a rack slidably related to the tubular body inside the same, said tubular body having a slot, a pin fixedly connected with said rack and extending through said slot to limit the longitudinal movement of the rack, said pin having a head, a resilient sealing strip having an opening for the reception of said pin and lying between the head thereof and an exterior face of said tubular body, a link means connecting one end of the rack with said lock element for rotating the latter step by step to a releasing position with respect to said hook, and resilient means cooperable on said rack and the line connecting means for moving the lock element step by step to its unlatching position.

JOHN H. PRIEST.